(12) United States Patent
Cheng et al.

(10) Patent No.: US 11,801,759 B2
(45) Date of Patent: *Oct. 31, 2023

(54) AUTONOMOUS MOBILE ROBOT AND WALKING METHOD THEREOF

(71) Applicant: ECOVACS ROBOTICS CO., LTD., Suzhou (CN)

(72) Inventors: Wenjie Cheng, Suzhou (CN); Jie Hou, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,237

(22) Filed: Feb. 10, 2022

(65) Prior Publication Data

US 2022/0161665 A1 May 26, 2022

Related U.S. Application Data

(62) Division of application No. 16/748,484, filed on Jan. 21, 2020, now Pat. No. 11,273,714.

(30) Foreign Application Priority Data

Jan. 30, 2019 (CN) .......................... 201910093765.7

(51) Int. Cl.
*B60K 7/00* (2006.01)
*B60L 15/20* (2006.01)

(52) U.S. Cl.
CPC ............ *B60L 15/20* (2013.01); *B60K 7/0007* (2013.01); *B60K 2007/0061* (2013.01); *B60L 2240/423* (2013.01)

(58) Field of Classification Search
CPC .......... B60K 7/0007; B60K 2007/0061; B60L 15/20; B60L 2240/423

(Continued)

(56) References Cited

U.S. PATENT DOCUMENTS 6,605,156 B1 * 8/2003 Clark ..................... A47L 5/30
134/21
7,975,790 B2 7/2011 Kim et al.
(Continued)

FOREIGN PATENT DOCUMENTS

CN 201496455 U 6/2010
CN 204971112 U 1/2016
(Continued)

OTHER PUBLICATIONS

European Search Report in Application No. 20748446.0 dated Oct. 28, 2022.

(Continued)

*Primary Examiner* — Hau V Phan (74) *Attorney, Agent, or Firm* — Maschoff Brennan (57) ABSTRACT

Embodiments of the present disclosure provide an autonomous mobile robot and a walking method thereof. The autonomous mobile robot includes a machine body, a driving wheel assembly and an obstacle crossing assembly. The driving wheel assembly is rotatably arranged on the machine body through a first rotating shaft. The driving wheel assembly includes a driving wheel. When the driving wheel moves from a first position to a second position relative to the machine body, the obstacle crossing assembly applies a force to the driving wheel assembly to make a change amplitude of positive pressure between the driving wheel and a traveling surface less than or equal to a set threshold value.

15 Claims, 6 Drawing Sheets

(58) Field of Classification Search
USPC .......................................................... 180/298
See application file for complete search history.

(56) References Cited

U.S. PATENT DOCUMENTS

| | | | |
|---|---|---|---|
| 8,763,200 | B2 | 7/2014 | Kim et al. |
| 9,033,079 | B2 | 5/2015 | Shin et al. |
| 9,936,844 | B2 | 4/2018 | Nakamura et al. |
| 10,239,370 | B2 | 3/2019 | Ebrahimi Afrouzi et al. |
| 11,273,714 | B2 * | 3/2022 | Cheng .................. B60K 7/0007 |
| 2013/0061420 | A1 | 3/2013 | Vanderstegen-Drake et al. |
| 2016/0015232 | A1 | 1/2016 | Nakamura et al. |
| 2017/0273521 | A1 | 9/2017 | Klintemyr et al. |
| 2017/0273524 | A1 | 9/2017 | Klintemyr et al. |

FOREIGN PATENT DOCUMENTS

| | | |
|---|---|---|
| CN | 208677290 U | 4/2019 |
| CN | 110115549 A | 8/2019 |
| EP | 2574263 A2 | 4/2013 |
| GB | 2494447 A | 3/2013 |
| KR | 10-2005-0068133 | 7/2005 |

OTHER PUBLICATIONS

European Office Action issued in corresponding application No. 20748446.0, dated May 3, 2023.

* cited by examiner

AUTONOMOUS MOBILE ROBOT AND WALKING METHOD THEREOF

TECHNICAL FIELD

The present disclosure relates to the field of electronic devices technology, and more particularly relates to an autonomous mobile robot and a walking method thereof.

BACKGROUND

Along with the constant development of sciences and technologies, household appliances have become more and more intelligent. Intelligent household appliances bring great convenience to work, live and study of users, one of which is autonomous mobile robot. An autonomous mobile robot may automatically finish floor cleaning work in a room by virtue of certain artificial intelligence.

At present, driving wheels of some autonomous mobile robots may realize floating regulation according to ground condition changes, thereby improving obstacle crossing capabilities of the robots. However, an existing floating obstacle crossing structure may provide a relatively weak driving force for a driving wheel, and thus a robot may cross a relatively small obstacle only and is very limited in an obstacle crossing capability.

SUMMARY

In view of the above problem, the present disclosure provides an autonomous mobile robot and a walking method thereof, to solve the above problem or at least partially solve the above problem.

Therefore, in an embodiment of the present disclosure, an autonomous mobile robot is provided. The autonomous mobile robot includes a machine body, a driving wheel assembly and an obstacle crossing assembly. The driving wheel assembly is rotatably arranged on the machine body through a first rotating shaft. The driving wheel assembly includes a driving wheel. When the driving wheel moves from a first position to a second position relative to the machine body, the obstacle crossing assembly applies a force to the driving wheel assembly to make a change amplitude of positive pressure between the driving wheel and a traveling surface less than or equal to a set threshold value.

In another embodiment of the present disclosure, an autonomous mobile robot is provided. The autonomous mobile robot includes a machine body, a driving wheel assembly and an obstacle crossing assembly. The driving wheel assembly is rotatably arranged on the machine body through a first rotating shaft. The driving wheel assembly includes a driving wheel. The obstacle crossing assembly includes a force application portion and a force bearing portion arranged on the driving wheel assembly. The force application portion includes a power member and a pressure plate rotatably arranged on the machine body through a second rotating shaft. The force bearing portion is positioned between the first rotating shaft and the second rotating shaft. When the driving wheel moves from a first position to a second position relative to the machine body, the pressure plate is pressed against the force bearing portion under the action of the power member to apply a force to the driving wheel assembly.

In another embodiment of the present disclosure, an autonomous mobile robot is also provided. The autonomous mobile robot includes a machine body, a driving wheel assembly and an obstacle crossing assembly. The driving wheel assembly is rotatably arranged on the machine body through a first rotating shaft. The driving wheel assembly includes a driving wheel. The obstacle crossing assembly includes a force application portion and a force bearing portion arranged on the driving wheel assembly. The force application portion is included in an elastic body. Along a deformation direction, one end of the elastic body is fixed to the machine body, and a roller assembly is arranged at the other end. The force bearing portion has a curved structure. When the driving wheel moves from a first position to a second position, the roller assembly is pressed against the curved structure under the action of the elastic body to apply a force to the driving wheel assembly.

In another embodiment of the present disclosure, a walking method of an autonomous mobile robot is also provided. The method includes:

when an obstacle is encountered, causing a driving wheel of a driving wheel assembly to move from a first position to a second position relative to a machine body; and when the driving wheel moves from the first position to the second position, applying, by an obstacle crossing assembly, a force to the driving wheel assembly to make a change amplitude of positive pressure between the driving wheel and a traveling surface less than or equal to a set threshold value.

In the embodiment of the autonomous mobile robot provided in the embodiment of the present disclosure, when the autonomous mobile robot encounters the obstacle and the machine body is jacked up or walks to a pit, the driving wheel assembly is subjected to the acting force applied by the obstacle crossing assembly, besides its own gravity, and under the combined action of these forces, the change amplitude of the positive pressure between the driving wheel and the traveling surface is less than or equal to the set threshold value, so that increase of a friction force between the driving wheel and the traveling surface and improvement of an obstacle crossing capability of the autonomous mobile robot are further facilitated.

In another embodiment of the autonomous mobile robot provided in the embodiment of the present disclosure, the pressure plate rotatably arranged on the machine body through the second rotating shaft is adopted, and the driving wheel assembly is subjected to a continuous acting force due to the pressure plate and the force bearing portion on the driving wheel assembly under the action of the power member; and in addition, with adoption of such a structure, an magnitude of the continuous acting force applied to the driving wheel assembly may be easily controlled to control the change amplitude of the positive pressure between the driving wheel and the traveling surface within a relatively small range, and the friction force between the driving wheel and the traveling surface is also relatively stable, so that improvement of the obstacle crossing capability of the autonomous mobile robot is facilitated.

In still another embodiment of the autonomous mobile robot provided in the embodiment of the present disclosure, the elastic body arranged on the machine body applies the continuous acting force to the driving wheel assembly through the curved structure under the action of its own elasticity. According to such a structure, the continuous acting force applied to the driving wheel assembly may be easily controlled by selecting a type of a spring and/or changing a curved shape of the curved structure to control the change amplitude of the positive pressure between the driving wheel and the traveling surface within a relatively small range, and the friction force between the driving wheel and the traveling surface is also relatively stable, so that improvement of the obstacle crossing capability of the autonomous mobile robot is facilitated.

In the embodiment of the walking method of the autonomous mobile robot provided in the embodiment of the present disclosure, when the obstacle is encountered and the driving wheel moves from the first position to the second position, the obstacle crossing assembly continuously applies the force to the driving wheel assembly to make the change amplitude of the positive pressure between the driving wheel and the traveling surface less than or equal to the set threshold value, so that the friction force between the driving wheel and the traveling surface is increased, and the obstacle crossing capability of the autonomous mobile robot is improved.

BRIEF DESCRIPTION OF THE DRAWINGS

In order to describe the technical solutions in the embodiments of the present disclosure or the prior art more clearly, the drawings required to be used for descriptions about the embodiments or the prior art will be simply introduced below. It is apparent that the drawings described below are some embodiments of the present disclosure. Those of ordinary skill in the art may further obtain other drawings according to these drawings without creative work.

DETAILED DESCRIPTION OF EXAMPLE EMBODIMENTS

When an autonomous mobile robot works, a driving wheel is required to carry out floating regulation according to a ground condition change to improve an obstacle crossing capability of the robot. A floating obstacle crossing mechanism is usually implemented through the action of a tension spring. For example, a cantilever driving wheel mechanism is provided in the prior art. According to the mechanism, a driving wheel is mounted on a chassis of a cleaning robot through a cantilever, and the driving wheel is deflected to a position far away from the chassis of the robot through a tension spring between the cantilever and the chassis of the robot. During cleaning, the autonomous mobile robot overcomes a spring force of the tension spring with the gravity to deflect the wheel to another position. When the mechanism is adopted, if the autonomous mobile robot encounters a step or an obstacle, the chassis is jacked up, the driving wheel is deflected to a position far away from the chassis of the robot under the action of the tension spring, and in this process, a certain spring force may be released by the tension spring to minimize a driving force that may be provided by the driving wheel when the autonomous mobile robot crosses the obstacle, resulting in reduction of the obstacle crossing capability of the autonomous mobile robot. Particularly, when the driving wheel is elevated and lowered under the action of the spring force, the acting force of the driving wheel changes greatly to easily cause the condition of jamming or slipping when the robot crosses an obstacle and reduce a climbing capability.

The present disclosure provides an autonomous mobile robot, which includes a machine body, a driving wheel assembly and an obstacle crossing assembly. The driving wheel assembly is rotatably arranged on the machine body through a first rotating shaft. The driving wheel assembly includes a driving wheel. When the driving wheel moves from a first position to a second position relative to the machine body, the obstacle crossing assembly applies a force to the driving wheel assembly to make a change amplitude of positive pressure between the driving wheel and a traveling surface less than or equal to a set threshold value.

Figure 1:
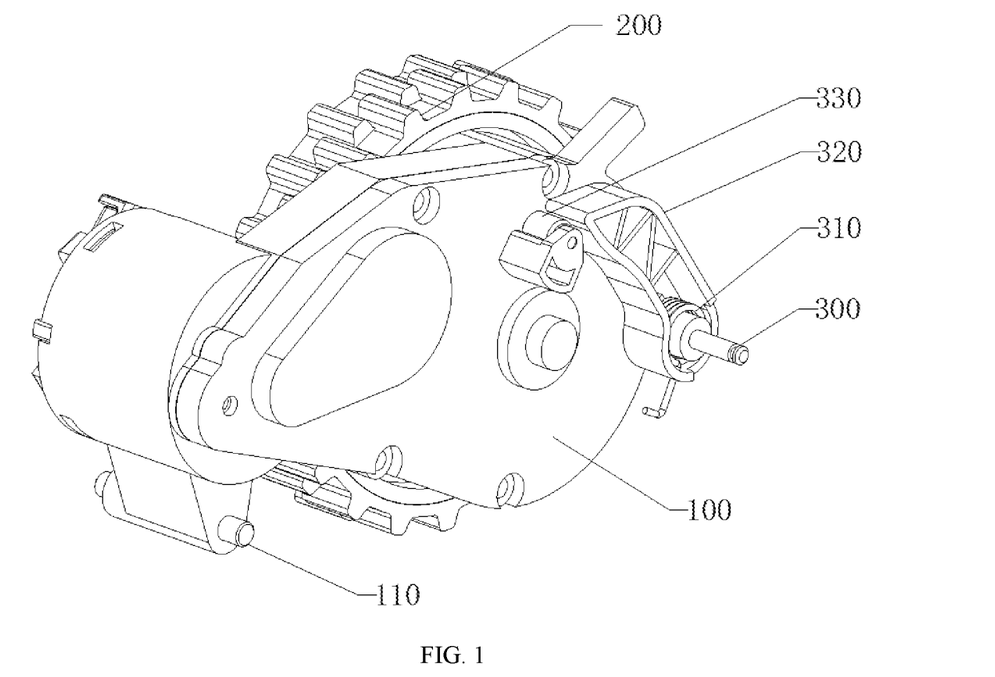
FIG. 1 is a structure diagram of a driving wheel assembly according to Embodiment 1 of the present disclosure.
Figure 2:
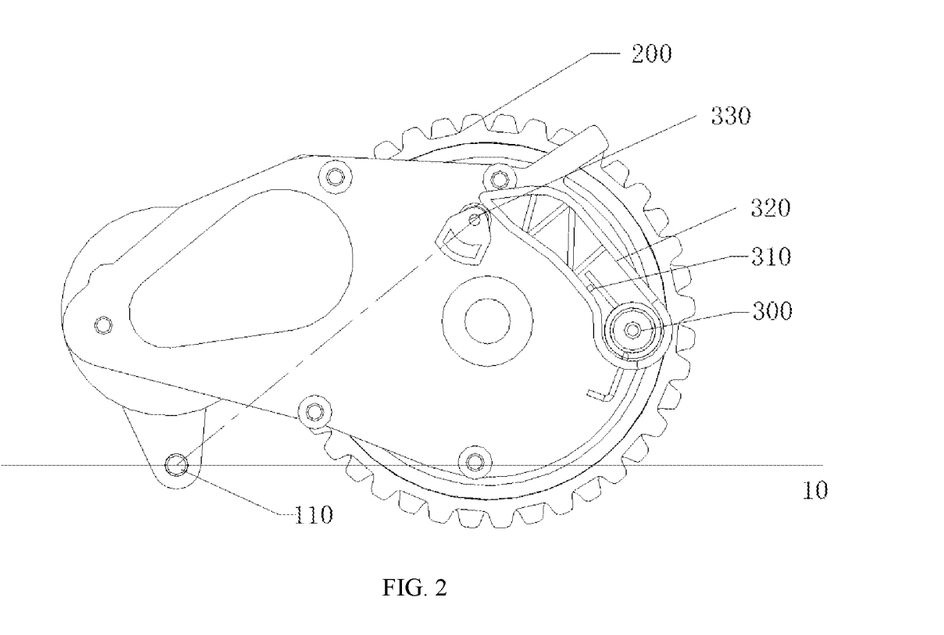
FIG. 2 is a structure diagram of a driving wheel assembly of which a driving wheel is at a first position according to Embodiment 1 of the present disclosure.
Figure 3:
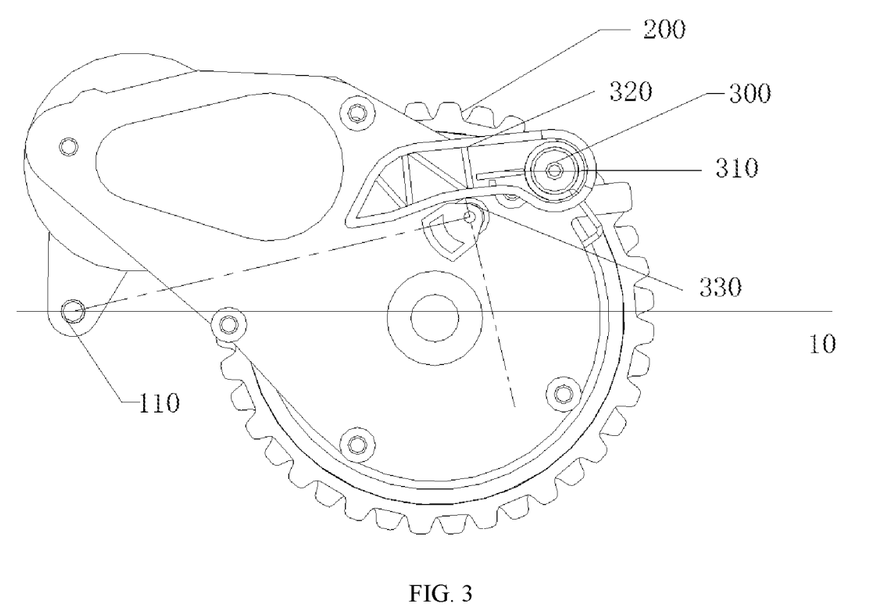
FIG. 3 is a structure diagram of a driving wheel assembly of which a driving wheel is at a second position according to Embodiment 1 of the present disclosure.

Specifically, referring to FIGS. 1-3, the machine body is provided with a base 10, and the driving wheel assembly is arranged on base 10 of the machine body. The driving wheel assembly includes a shell 100, one end of the shell 100 is rotatably arranged on the base 10 of the autonomous mobile robot through the first rotating shaft 110, the driving wheel 200 is further arranged at the other end of the shell 100, and the driving wheel 200 is used for driving the autonomous mobile robot to walk. The driving wheel 200 is rotatable about the first rotating shaft 110. Specifically, when the autonomous mobile robot walks on a plane, the driving wheel assembly is subjected to a gravity of the autonomous mobile robot and a limiting action of the base 10 and thus the driving wheel 200 is at the first position (a high position) relative to the base 10 of the machine body; and when the machine body of the autonomous mobile robot is taken up or the driving wheel 200 does not contact with a ground and is kept suspended, the driving wheel 200 rotates to the second position (a low position) about the first rotating shaft 110 under the action of its own gravity. It is to be noted that the second position may change. For example, a second position that may be reached by driving wheel when the machine body is taken up (the driving wheel does not contact with the ground) is usually lower than a second position that may be reached by the driving wheel when the autonomous mobile robot is on a carpet or climbs. Here, a distance between the driving wheel and the base of the robot is taken as a reference for the height, and if the distance with the base of the autonomous mobile robot is longer, the position of the driving wheel is lower.

During specific implementation, the set threshold value in the embodiment of the present disclosure may specifically be a value in 0~25%. For example, the set threshold value may be 20%, or 16%, etc.

When the driving wheel moves from the first position to the second position relative to the machine body, the acting force applied to the driving wheel assembly by the obstacle crossing assembly changes, and thus the positive pressure between the driving wheel and the traveling surface also changes. For example, the positive pressure increases at first and then decreases or is substantially constant. Determination of the "change amplitude of the positive pressure" mentioned in the embodiment of the present disclosure will be described through the following specific example. There is made such a hypothesis that, when the driving wheel moves from the first position to the second position, the positive pressure is shown in Table 1.

TABLE 1

| (Positive Pressure ChangeTable) | | | | | | | |
|---|---|---|---|---|---|---|---|
| Positive | Stroke | | | | | | |
| pressure | 0 | 5 | 10 | 15 | 20 | 25 | 30 | 35 |
| | 9.6 | 9.9 | 9.9 | 10.2 | 9.5 | 9.1 | 8.6 | |

Based on the positive pressure data, a maximum positive pressure change during movement of the driving wheel from the first position (corresponding to stroke 0) to the second position (corresponding to stroke 30) may be 10.2−8.6=1.6; and correspondingly, the change amplitude of the positive pressure is 1.6/10.2=15.7%.

During specific implementation, a proper structural design may be selected to make a magnitude of the change amplitude of the positive pressure between the driving wheel and the travel plane less than or equal to the set threshold value during movement of the driving wheel from the first position to the second position. The change amplitude of the positive pressure is controlled within a certain range, so that increase of a friction force between the driving wheel and the traveling surface and further improvement of an obstacle crossing capability of the autonomous mobile robot are facilitated. The specifically adopted structural design will be described through the following contents.

A torque is a product of the acting force and a force arm. Therefore, the technical solution provided in the embodiment of the present disclosure may also be specifically as follows: the obstacle crossing assembly is further arranged on the autonomous mobile robot, and the obstacle crossing assembly is arranged to provide an increasing or substantially constant torque for the driving wheel assembly when the driving wheel 200 is switched from the first position to the second position, namely the torque through which the obstacle crossing assembly provides power for the driving wheel assembly increases or is substantially constant after the driving wheel assembly extends downwards. It is to be noted that "being substantially constant" rather than "being constant" is used herein because even if those skilled in the art design a provided torque of a product to be constant, due to a difference between theory and practice, errors inevitably exist when the product is produced and assembled, the product may be worn during use and it may not be accurately ensured that the torque provided by the obstacle crossing assembly of the practical product for the driving wheel assembly is constant when the driving wheel 200 is switched from the first position to the second position. Particularly, being substantially constant means that a change of the torque provided by the obstacle crossing assembly when the driving wheel 200 is at the second position relative to the torque provided by the obstacle crossing assembly when the driving wheel 200 is at the first position is less than or equal to 10% of the torque provided by the obstacle crossing assembly when the drive wheel 200 is at the first position. Therefore, "being substantially constant" may also be expressed as follows: the obstacle crossing assembly provides a torque that is stable in a set error range for the driving wheel assembly.

It is to be supplemented that, when the driving wheel 200 is switched from the first position to the second position, the obstacle crossing assembly may provide a substantially constant torque for the driving wheel assembly in multiple manners. For example, when the driving wheel 200 is switched from the first position to the second position, the torque provided by the obstacle crossing assembly is substantially constant, or the torque provided by the obstacle crossing assembly decreases at first and then increases, or the torque provided by the obstacle crossing assembly increases at first and then decreases, or a magnitude of the torque provided by the obstacle crossing assembly fluctuates like waves. Similarly, when the driving wheel 200 is switched from the first position to the second position, the obstacle crossing assembly may also provide an increasing torque for the driving wheel assembly in multiple manners. For example, when the driving wheel 200 is switched from the first position to the second position, the torque provided by the obstacle crossing assembly keeps increasing, or the torque provided by the obstacle crossing assembly decreases at first and then increases, or the torque provided by the obstacle crossing assembly increases at first and then decreases, or the magnitude of the torque provided by the obstacle crossing assembly fluctuates like waves. In other words, there is at least part of a movement stage during switching of the driving wheel 200 from the first position to the second position, and in such case, the obstacle crossing assembly provides the increasing or substantially constant torque for the driving wheel assembly, thereby ensuring that the increasing or substantially constant torque is provided for the driving wheel assembly when the driving wheel 200 is switched from the first position to the second position.

Those skilled in the art may select a proper manner according to a practical requirement to implement that the obstacle crossing assembly provides the increasing or substantially unchanged torque for the driving wheel assembly. Furthermore, when the driving wheel 200 is switched from the first position to the second position, it is not limited in the present disclosure that the torque provided for the driving wheel assembly by the obstacle crossing assembly increases or is substantially constant even though the torque provided by the obstacle crossing assembly when the driving wheel 200 is at the second position is less than the torque provided by the obstacle crossing assembly when the driving wheel 200 is at the first position, and the obstacle crossing assembly provides the increasing or substantially constant torque for the driving wheel assembly if there is at least part of the movement stage during switching the driving wheel 200 from the first position to the second position.

For achieving the purpose that the change amplitude of the positive pressure between the driving wheel provided in the embodiment of the present disclosure and the traveling surface is less than or equal to the set threshold value, the obstacle crossing assembly includes a force bearing portion arranged on the shell 100 and a force application portion arranged on the base 10. When the autonomous mobile robot is stationary on a flat ground or walks normally on a plane, the driving wheel assembly is subjected to the gravity of the autonomous mobile robot and the limiting action of the base 10 and thus the driving wheel 200 is at the first position. In such case, a direction of an acting force applied to the force bearing portion by the force application portion passes through the first rotating shaft 110, namely a torque generated by the force application portion is zero. The force application portion applies the acting force to the force bearing portion, but the acting force is far less than the gravity of the machine body of the autonomous mobile robot, so that the driving wheel 200 is at the first position. When the machine body of the autonomous mobile robot is jacked up or the driving wheel 200 walks to a pit, the driving wheel 200 rotates about the first rotating shaft 110 and extends out under the action of its own gravity to change relative positions of the force bearing portion and the force application portion, and the direction of the acting force applied to the force bearing portion by the force application portion deviates downwards to generate an effective torque, so that the driving wheel assembly is subjected to the effective torque of the acting force applied by the force application portion, besides its own gravity, and by the acting force, the friction between the driving wheel 200 and the ground is increased and obstacle crossing is facilitated. A magnitude and torque of the acting force applied to the force bearing portion by the force application portion may be regulated by changing shapes of the force application portion and the force bearing portion.

It is to be supplemented that the position of the force application portion relative to the force bearing portion may also be changed to ensure that, when the autonomous mobile robot is stationary on the flat ground or walks normally on the plane, the direction of the acting force applied to the force bearing portion by the force application portion does not pass through the first rotating shaft 110, namely the force application portion has applied the effective torque of a downward acting force to the force bearing portion, but the driving wheel 200 is still at the first position due to the action of the gravity of the autonomous mobile robot, and when the machine body of the autonomous mobile robot is jacked up or the driving wheel 200 walks to a pit, the driving wheel 200 rotates about the first rotating shaft 110 and extends out downwards under the action of its own gravity and the acting force applied by the force application portion.

The technical solutions of each embodiment of the present disclosure will be clearly and completely described below in combination with the drawings. It is apparent that the described embodiments are not all embodiments but only part of embodiments of the present disclosure. Based on the embodiments in the present disclosure, all other embodiments obtained by those of ordinary skill in the art without paying creative work fall within the protection scope of the present disclosure. In addition, it is to be noted that descriptions like "first" and "second", etc. are adopted herein to distinguish different structures, parts and the like and do not represent any sequence, and it is not limited that "first" and "second" are different types.

FIG. 1 is a structure diagram of a driving wheel assembly according to Embodiment 1 of the present disclosure. FIG. 2 is a structure diagram of a driving wheel assembly of which a driving wheel is at a first position according to Embodiment 1 of the present disclosure. FIG. 3 is a structure diagram of a driving wheel assembly of which a driving wheel is at a second position according to Embodiment 1 of the present disclosure. As shown in FIGS. 1-3, in the embodiment, the force application portion includes a pressure plate 320 and a power member, the pressure plate 320 is rotatably arranged on the base 10 through a second rotating shaft 300, the force bearing portion is positioned between the second rotating shaft 300 and the first rotating shaft 110, and the pressure plate 320 is pressed against the force bearing portion under the action of the power member to apply a force to the driving wheel assembly. For reducing friction between the force bearing portion and the force application portion, the force bearing portion may adopt a first roller 330 or a cylinder, etc. The power member may be a torsion spring 310 sleeved on the second rotating shaft 300, and one end of the torsion spring 310 is pressed against the pressure plate. The side, pressed against the force bearing portion, of the pressure plate 320 includes a curved pressure section of which a shape may be regulated according to an initial torsional force of the torsion spring 310 and relative positions of the first rotating shaft 110, the second rotating shaft 300 and the force bearing portion such that the obstacle crossing assembly may provide the increasing torque for the driving wheel assembly when the driving wheel 200 is switched from the first position to the second position. The pressure plate 320 contacts with the first roller 330 under a torsional force provided by the torsion spring 310 and applies the acting force to the driving wheel assembly through the first roller 330. In the embodiment, as a walking environment of the autonomous mobile robot changes, the relative positions of the force application portion and the force bearing portion may also change, and the force application portion and the force bearing portion keep in contact under the acting force of the torsion spring 310.

From the prospective of the acting force, a working principle of the autonomous mobile robot provided in Embodiment 1 is as follows: when the autonomous mobile robot works normally (namely working on the flat ground), the driving wheel assembly rotates to a maximum limiting angle about the first rotating shaft 110 under the action of the gravity of the machine body (as shown in FIG. 2). In such case, a compression angle, i.e., a stored torsional force, of the torsion spring 310 is maximum, but included angles between a normal direction of a contact point of the pressure plate 320 and the first roller 330 and center lines of the first roller 330 and the first rotating shaft 110 are 0°, so that the pressure plate 320 only generates pressure passing through an axle center of the first rotating shaft 110 on the driving wheel assembly. When the autonomous mobile robot encounters a step or an obstacle, the base 10 of the machine body is jacked up, the driving wheel assembly generates a certain torque on the first rotating shaft 110 under the action of its own gravity, in such case, the driving wheel assembly rotates about the first rotating shaft 110 counterclockwise, and when the driving wheel assembly rotates, the first roller 330 rolls along a surface of the pressure plate 320 and the included angles between the normal direction of the contact point of the pressure plate 320 and the first roller 330 and the centerlines of the first roller 330 and the first rotating shaft 110 are continuously enlarged. When the drive wheel assembly rotates to a minimum limiting angle about the first rotating shaft 110 (as shown in FIG. 3), the included angles between the normal direction of the contact point of the pressure plate 320 and the first roller 330 and the center lines of the first roller 330 and the first rotating shaft 110 are angles (for example, 90°) shown in FIG. 3. In such case, the pressure of the pressure plate 320 on the first roller 330 is all converted into normal pressure of the driving wheel 200 on the traveling surface to maximize a friction force of the driving wheel 200 on the traveling surface, thereby maximizing the driving force and obstacle crossing capability of the autonomous mobile robot.

From the perspective of the torque, the working principle of the autonomous mobile robot provided in Embodiment 1 is as follows: when the autonomous mobile robot is stationary on the flat ground or walks normally on the plane, the driving wheel assembly is subjected to the gravity of the autonomous mobile robot and the limiting action of the base 10 and thus the driving wheel 200 is at the first position; and in such case, the pressure plate 320 rotates to the first roller 330 about the second rotating shaft 300 under the action of the stored torsion force of the torsion spring 310 to apply an acting force to the first roller 330. In the embodiment, as shown in FIG. 2, the direction of the acting force passes through the first rotating shaft 110 and the torque is zero, namely the acting force does not provide effective power for rotation and extension of the driving wheel assembly. When the machine body of the autonomous mobile robot is jacked up (for example, a front section of the machine body is jacked up during climbing, or the machine body is jacked up by carpet bristles during walking on a carpet) or the driving wheel 200 walks to a pit, the driving wheel 200 drives the driving wheel assembly under the action of its own gravity to rotate about the first rotating shaft 110 and extend out, the direction of the acting force applied to the first roller 330 by the pressure plate 320 changes, the first roller 330 rolls along the surface of the pressure plate 320 when the driving wheel assembly rotates, the included angles between the normal direction of the contact point of the pressure plate 320 and the first roller 330 and the center lines of the first roller 330 and the first rotating shaft 110 are continuously enlarged, and an increasing torque is generated. The driving wheel assembly is subjected to the torsional force of the torsion spring 310, besides its own gravity. In other words, when the machine body of the autonomous mobile robot is jacked up or the driving wheel 200 walks to a pit, the driving wheel 200 is switched from the first position to the second position, and the torque for rotation and extension of the driving wheel assembly increases, so that obstacle crossing is facilitated.

Figure 4:
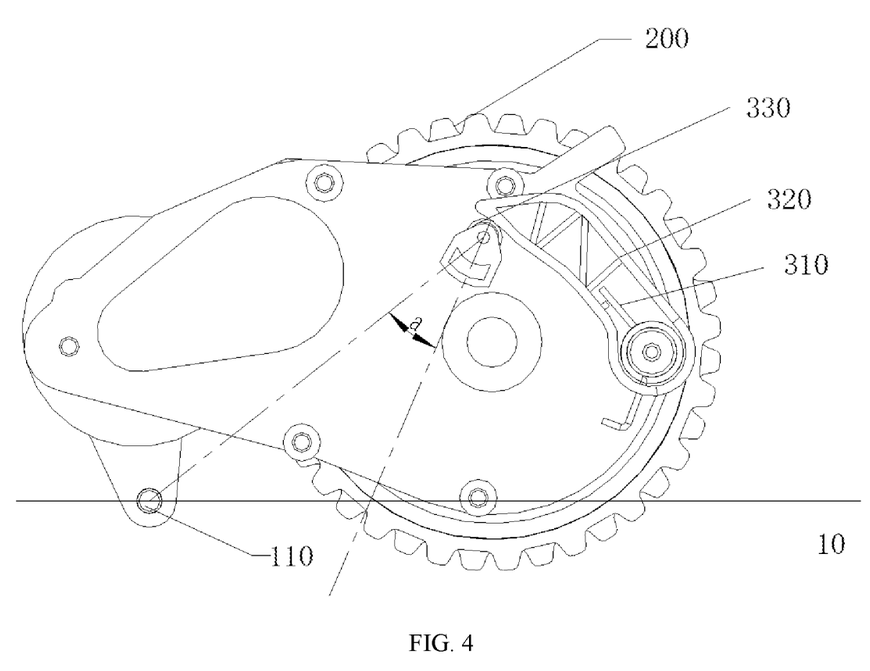
FIG. 4 is a structure diagram of a driving wheel assembly of which a driving wheel is at a first position according to Embodiment 2 of the present disclosure.
Figure 5:
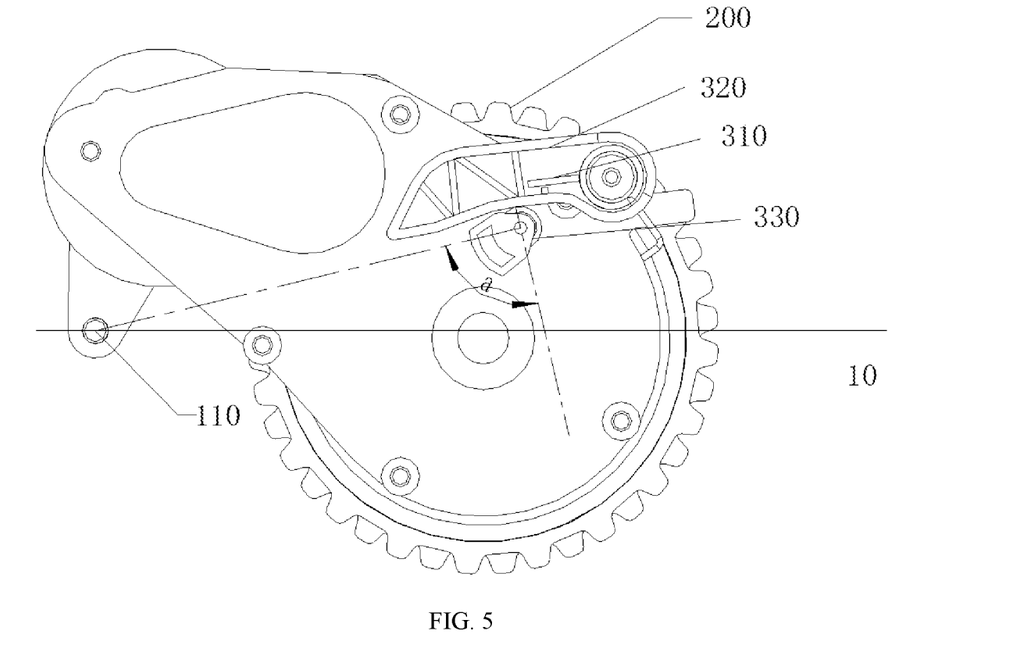
FIG. 5 is a structure diagram of a driving wheel assembly of which a driving wheel is at a second position according to Embodiment 2 of the present disclosure.
Figure 6:
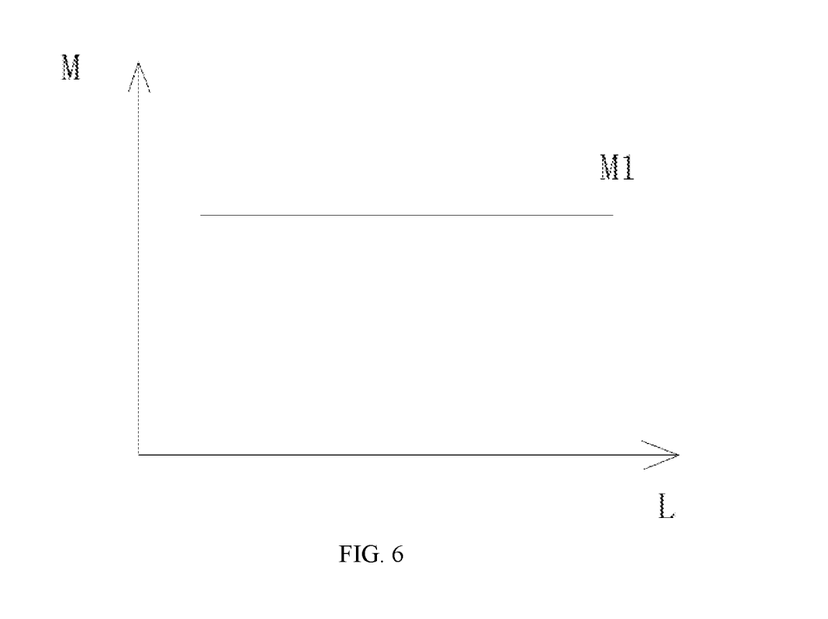
FIG. 6 is a schematic diagram of a torque applied to a driving wheel assembly in an extension process of a driving wheel according to Embodiment 2 of the present disclosure.

FIG. 4 is a structure diagram of a driving wheel assembly of which a driving wheel is at a first position according to Embodiment 2 of the present disclosure. FIG. 5 is a structure diagram of a driving wheel assembly of which a driving wheel is at a second position according to Embodiment 2 of the present disclosure. FIG. 6 is a schematic diagram of a torque applied to a driving wheel assembly in an extension process of a driving wheel according to Embodiment 2 of the present disclosure. As shown in FIGS. 4-6, compared with Embodiment 1, in the embodiment, the relative positions of the force application portion and the force bearing portion change, and in such case, when the driving wheel 200 is at the first position, a connecting line of the first roller 330 and the first rotating shaft 110 forms an included angle a with a direction in which the pressure plate 320 applies the acting force to the first roller 330. Preferably, a range of the included angle a is 0°<a≤90°. In the embodiment, a is 30°, and in such case, a torsion angle of the torsion spring 310 is 90°. When the driving wheel 200 is at the second position, the included angle a between the connecting line of the first roller 330 and the first rotating shaft 110 and the direction in which the pressure plate 320 applies the acting force to the first roller 330 is 90°, the torsion angle of the torsion spring 310 is 45°, and when the driving wheel 200 is switched from a normal walking state to an obstacle crossing state, the torsional force of torsion spring 310 is halved but a force arm from an application point of the pressure plate 320 to the second rotating shaft is doubled, so that the obstacle crossing assembly may keep the torque acting on the driving wheel 200 at the second position and the first position constant or substantially constant. In combination with FIG. 6, in FIG. 6, the ordinate is the torque M applied to the driving wheel assembly by the force application portion by taking the first rotating shaft 110 as a rotation axis, and the abscissa is a distance L by which the driving wheel assembly rotates and extends out. It may be seen from FIG. 6 that the torque applied to the driving wheel assembly by the force application portion during rotation and extension of the driving wheel assembly is constant and always M1. In other words, when the machine body of the autonomous mobile robot is jacked up (for example, the front section of the machine body is jacked up during climbing, or the machine body is jacked up by carpet bristles during walking on a carpet) or the driving wheel 200 walks to a pit, the driving wheel 200 is switched from the first position to the second position, and the torque for rotation and extension of the driving wheel assembly is constant, so that obstacle crossing is facilitated.

It is be noted that the angle a and the torsion angle of the torsion spring 310 are not limited in the present disclosure and may be designed by those skilled in the art according to the practical requirement.

Figure 7:
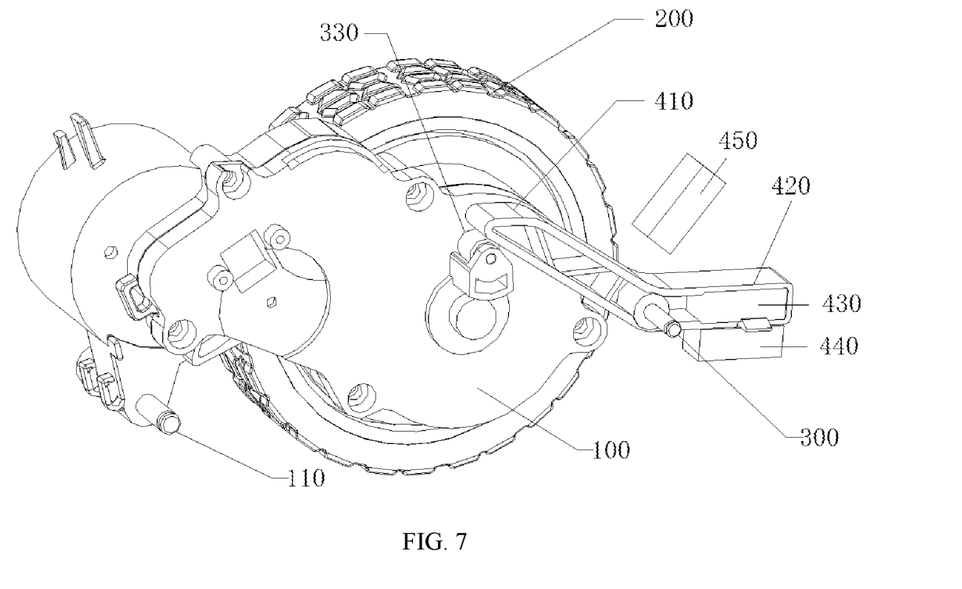
FIG. 7 is a structure diagram of a driving wheel assembly according to Embodiment 3 of the present disclosure.
Figure 8:
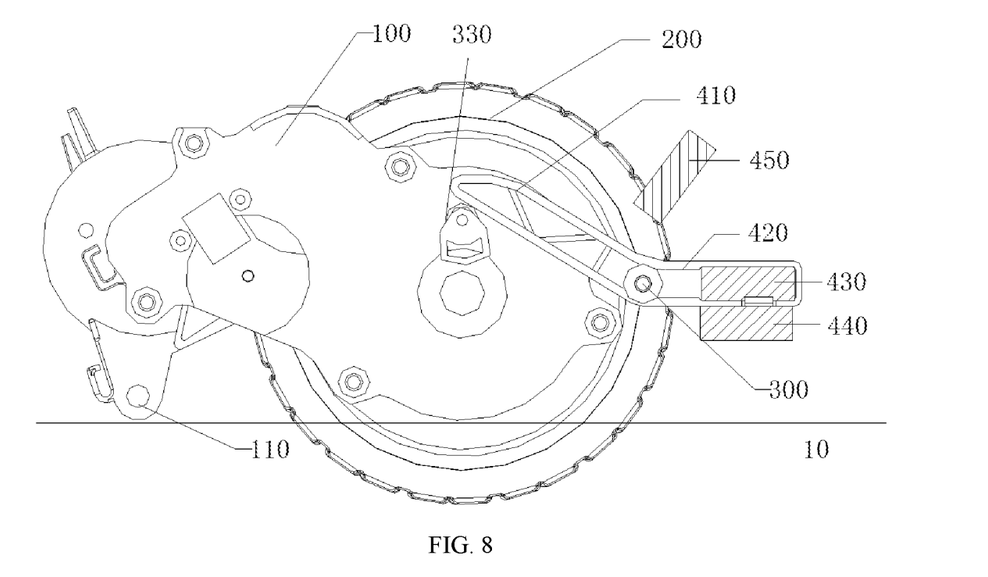
FIG. 8 is a structure diagram of a driving wheel assembly of which a driving wheel is at a first position according to Embodiment 3 of the present disclosure.
Figure 9:
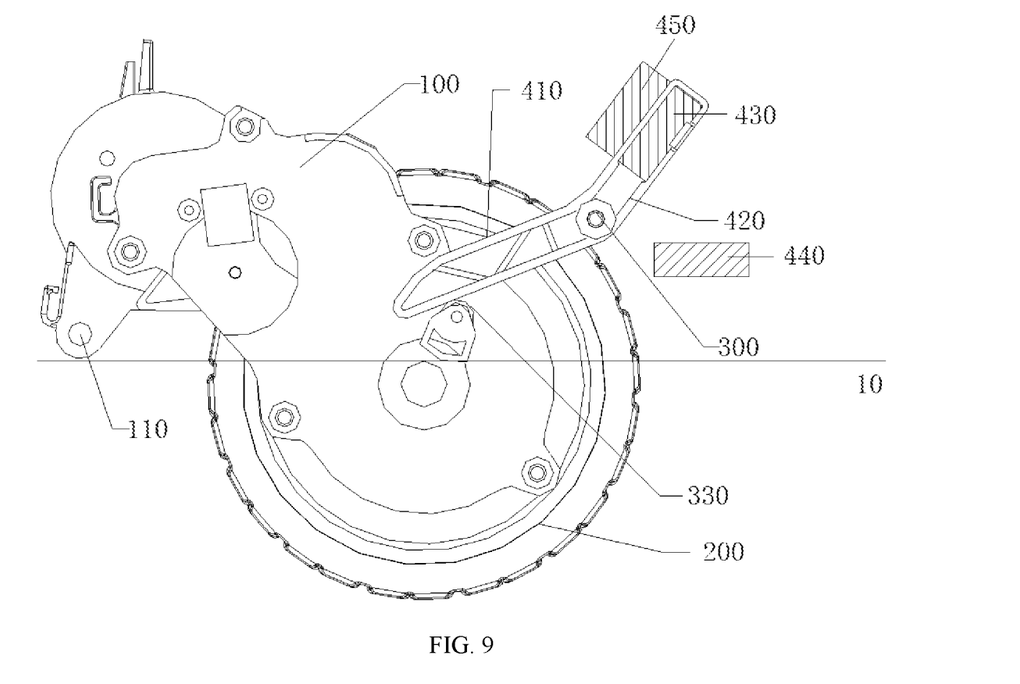
FIG. 9 is a structure diagram of a driving wheel assembly of which a driving wheel is at a second position according to Embodiment 3 of the present disclosure.

FIG. 7 is a structure diagram of a driving wheel assembly according to Embodiment 3 of the present disclosure. FIG. 8 is a structure diagram of a driving wheel assembly of which a driving wheel is at a first position according to Embodiment 3 of the present disclosure. FIG. 9 is a structure diagram of a driving wheel assembly of which a driving wheel is at a second position according to Embodiment 3 of the present disclosure. As shown in FIGS. 7-9, the difference between the embodiment and the abovementioned embodiments is that the pressure plate includes a force application end 410 pressed against the force bearing portion and a power end 420 generating power. The second rotating shaft 300 is arranged between the force application end and the power end, the power member includes a first magnet 430 and a second magnet 440, the first magnet 430 is arranged at the power end, the second magnet 440 is arranged on the base, the second magnet 440 is positioned below the first magnet 430, and a repulsive force is generated between the second magnet and the first magnet. Similarly, the force bearing portion is a first roller 330 fixed between the force application portion and the first rotating shaft 110. Furthermore, a third magnet 450 may further be arranged on the base 10, the third magnet is positioned above the first magnet 430, and an attractive force is generated between the third magnet and the first magnet. That is, opposite surfaces of the third magnet 450 and the first magnet 430 are different poles (for example, an N pole of the third magnet 450 faces an S pole of the first magnet 430), and opposite surfaces of the second magnet 440 and the first magnet 430 are the same poles (for example, an N pole of the second magnet 440 faces an N pole of the first magnet 430). Through the action of magnetic forces between the first magnet 430 and each of the second magnet 440 and the third magnet 450, the power end 420 is subjected to an upward rotating acting force under the action of the magnetic forces, and the force application end 410 is subjected to a downward rotating acting force under leverage, so that an acting force for rotation and extension is applied to the driving wheel assembly through the first roller 330.

From the prospective of the acting force, a working principle of the autonomous mobile robot provided in Embodiment 3 is as follows: when the autonomous mobile robot works normally (working on the flat ground), the driving wheel assembly rotates to the maximum limiting angle about the first rotating shaft 110 under the action of the gravity of the machine body (as shown in FIG. 2), and in such case, the repulsive force between the magnet 3 and the magnet 2 is maximum and the attractive force between the first magnet 430 and the third magnet 450 is minimum. When the autonomous mobile robot encounters a step or an obstacle, the base 10 of the machine body of the autonomous mobile robot is jacked up, the force application end 410 of the pressure plate rotates about the second rotating shaft 300 counterclockwise under the action of the repulsive force between the second magnet 440 and the first magnet 430, and during rotation of the force application end 410 of the pressure plate, the repulsive force between the second magnet 440 and the first magnet 430 gradually decreases while the attractive force between the third magnet 450 and the first magnet 430 gradually increases. When the driving wheel assembly rotates to the minimum limiting angle about the first rotating shaft 110 (as shown in FIG. 3), the repulsive force between the second magnet 440 and the first magnet 430 is minimum while the attractive force between the third magnet 450 and the first magnet 430 is maximum. It may be ensured that magnitudes of the acting forces of the third magnet 450 and the second magnet 440 on the first magnet 430 during floating of the driving wheel 200 are equal, namely a magnitude of the pressure of the pressure plate on the driving wheel assembly is equal, so that the driving force of the autonomous mobile robot during obstacle crossing is kept constant.

From the prospective of the torque, the working principle of the autonomous mobile robot provided in Embodiment 3 is as follows: when the autonomous mobile robot is stationary on a flat ground or walks normally on a plane, the driving wheel assembly is subjected to the gravity of the autonomous mobile robot and the limiting action of the base 10 and thus the driving wheel 200 is at the first position; and in such case, although the first magnet 430 is subjected to the magnetic forces of the second magnet 440 and the third magnet 450, since the acting force applied to the first roller 330 by the force application end 410 passes through the first rotating shaft 110, the torque is zero, namely the force application portion does not provide an effective force for rotation and extension of the driving wheel assembly. When the machine body of the autonomous mobile robot is jacked up (for example, a front section of the machine body is jacked up during climbing, or the machine body is jacked up by carpet bristles during walking on a carpet) or the driving wheel 200 walks to a pit, the driving wheel 200 drives the driving wheel assembly under the action of its own gravity to rotate about the first rotating shaft 110 and extend out, the direction of the acting force applied to the first roller 330 by the force application end 410 changes, the first roller 330 rolls along a surface of the force application end 410 when the driving wheel assembly rotates, included angles between a normal direction of a contact point of the force application end 410 and the first roller 330 and the center lines of the first roller 330 and the first rotating shaft 110 are continuously enlarged, and an increasing torque is generated. The driving wheel assembly is subjected to magnetic forces, besides its own gravity. In other words, when the machine body of the autonomous mobile robot is jacked up or the driving wheel 200 walks to a pit, the driving wheel 200 is switched from the first position to the second position, and the torque for rotation and extension of the driving wheel assembly increases, so that obstacle crossing is facilitated.

Figure 10:
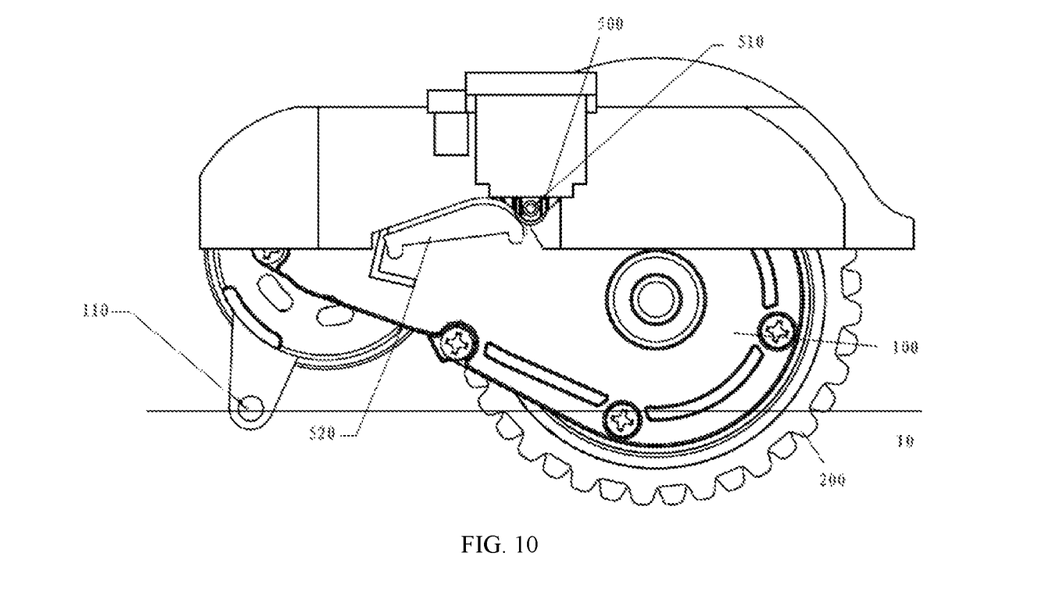
FIG. 10 is a structure diagram of a driving wheel assembly according to Embodiment 4 of the present disclosure.

FIG. 10 is a structure diagram of a driving wheel assembly according to Embodiment 4 of the present disclosure. The force application portion includes an elastic body. Along a deformation direction, one end of the elastic body is fixed to the machine body, and a roller assembly is arranged at the other end. The force bearing portion has a curved structure. The roller assembly is pressed against the curved structure to apply a force to the driving wheel assembly. The elastic body may be a spring or a deformed soft rubber material, etc. There are no specific limits made thereto in the embodiment of the present disclosure. Specifically, as shown in FIG. 10, in the embodiment, the force application portion includes a spring 500 that is vertically arranged and a roller assembly 510 at a bottom of the spring 500, an upper end of the spring 500 is fixed to the base 10, the roller assembly 510 includes a roller bracket and a second roller, an upper end of the roller bracket is fixed at the bottom of the spring 500, and the second roller is rotatably arranged at a lower end of the roller bracket through a second roller shaft. The force bearing portion includes a curved structure 520 fixed to the shell 100 and pressed against the second roller. The roller assembly 510 applies an acting force to the driving wheel assembly through the curved structure 520 under the action of stored elasticity of the spring 500.

Specifically, when the autonomous mobile robot is stationary on a flat ground or walks normally on a plane, the driving wheel assembly is subjected to the gravity of the autonomous mobile robot and the limiting action of the base 10 and the driving wheel 200 is at the first position. In such case, the roller assembly 510 applies the acting force to the driving wheel assembly through the curved structure 520 under the action of the stored elasticity of the spring 500. In the embodiment, a direction of the acting force passes through the first rotating shaft 110 and the torque is zero, namely the acting force does not provide effective power for rotation and extension of the driving wheel assembly. When the machine body of the autonomous mobile robot is jacked up (for example, a front section of the machine body is jacked up during climbing, or the machine body is jacked up by carpet bristles during walking on a carpet) or the driving wheel 200 walks to a pit, the driving wheel 200 drives the driving wheel assembly under the action of its own gravity to rotate about the first rotating shaft 110 and extend out, the direction of the acting force applied to the curved structure 520 by the roller assembly 510 changes, the second roller rolls along a surface of the curved structure 520 when the driving wheel assembly rotates, included angles between a normal direction of a contact point of the second roller and the curved structure 520 and center lines of the second roller and the first rotating shaft 110 are continuously enlarged, and an increasing torque is generated. The driving wheel assembly is subjected to the elasticity of the spring 500, besides its own gravity. In other words, when the machine body of the autonomous mobile robot is jacked up or the driving wheel 200 walks to a pit, the driving wheel 200 is switched from the first position to the second position, and the torque for rotation and extension of the driving wheel assembly increases, so that obstacle crossing is facilitated.

According to the technical solution provided in the embodiment, the continuous acting force applied to the driving wheel assembly may be controlled by selecting a type of the spring and/or changing a curved shape of the curved structure to control the change amplitude of the positive pressure between the driving wheel and the traveling surface within a relatively small range, and the friction force between the driving wheel and the traveling surface is also relatively stable, so that improvement of the obstacle crossing capability of the autonomous mobile robot is facilitated.

Figure 11:
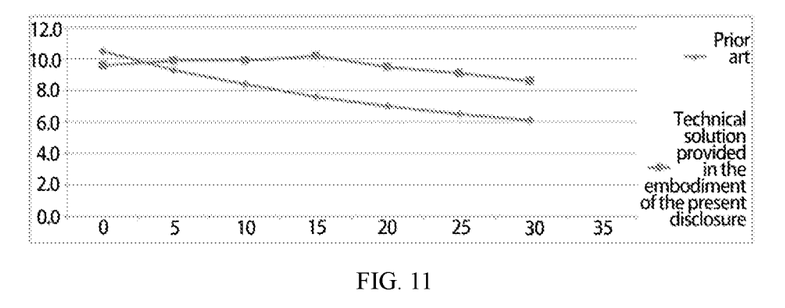
FIG. 11 is a curve comparison diagram of a change of pressure of a driving wheel on a ground in the prior art and the change of the pressure of the driving wheel on the ground in the technical solutions provided in the embodiments of the present disclosure.

According to each implementation structure of the obstacle crossing assembly provided in each embodiment, the acting force on the driving wheel changes less. Experiments show that, in each embodiment of the present disclosure, the pressure of the driving wheel on the traveling surface ranges from 8.6 to 10.2, the change amplitude is about 20% and the obstacle crossing capability is high. In the prior art, a tension spring cantilever lifting mechanism is adopted, the pressure of the driving wheel on the ground ranges from 6.1 to 10.5, the change amplitude is about 40%, and the obstacle crossing capability is relatively low. FIG. 11 is a curve comparison diagram of a change of pressure of a driving wheel on a ground in the prior art and the change of the pressure of the driving wheel on the ground in the technical solutions provided in the embodiments of the present disclosure. The following Table 2 is a comparison table of positive pressure on the driving wheel in the prior art and the technical solution provided in the embodiment of the present disclosure.

TABLE 2

(Comparison Table of Positive Pressure on Driving Wheel)

| Positive pressure | stroke | | | | | | | |
|---|---|---|---|---|---|---|---|---|
| | 0 | 5 | 10 | 15 | 20 | 25 | 30 | 35 |
| Prior art | 10.5 | 9.3 | 8.4 | 7.6 | 7.0 | 6.5 | 6.1 | |
| Embodiment of the present disclosure | 9.6 | 9.9 | 9.9 | 10.2 | 9.5 | 9.1 | 8.6 | |

According to the technical solution provided in the present disclosure, the pressure of the driving wheel on the traveling surface ranges from 8.6N to 10.2N, the change amplitude is about 20%, the driving wheel is unlikely to jam, the pressure of the driving wheel on the ground is relatively high, the provided friction force is stronger, and the obstacle crossing capability is high.

Figure 12:
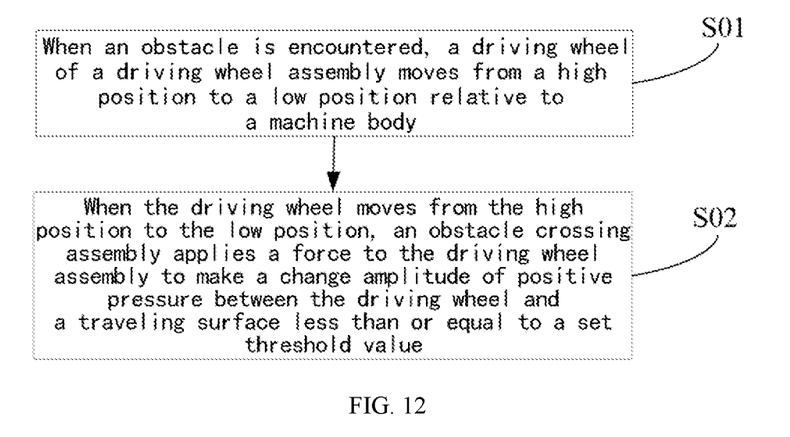
FIG. 12 is a flowchart of a walking method of an autonomous mobile robot according to an embodiment of the present disclosure.

FIG. 12 is a flowchart of a walking method of an autonomous mobile robot according to an embodiment of the present disclosure. As shown in FIG. 12, the method includes:

S01, when an obstacle is encountered, casing a driving wheel of a driving wheel assembly to move from a first position to a second position relative to a machine body.

S02, when the driving wheel moves from the first position to the second position, an obstacle crossing assembly applies a force to the driving wheel assembly to make a change amplitude of positive pressure between the driving wheel and a traveling surface less than or equal to a set threshold value.

It is to be noted herein that specific implementation of structural features involved in the embodiment and a connecting relationship between the structural features may refer to the corresponding contents in each embodiment and will not be elaborated herein.

The set threshold value is 0~25%.

S02 may also be specifically as follows: the obstacle crossing assembly provides an increasing torque for the driving wheel assembly, or the obstacle crossing assembly provides a torque that is stable in a set error range for the driving wheel assembly.

During specific implementation, the obstacle crossing assembly may provide the increasing torque or the torque that is stable in the set error range for the driving wheel assembly in a whole movement stage of movement of the driving wheel from the first position to the second position or part of the movement stage.

That is, there is at least part of the movement stage during movement of the driving wheel from the first position to the second position, and the obstacle crossing assembly provides the increasing torque or the torque that is stable in the set error range for the driving wheel assembly.

In the embodiment of the present disclosure, when the obstacle is encountered and the driving wheel moves from the first position to the second position, the obstacle crossing assembly applies a continuous acting force to the driving wheel assembly to make the change amplitude of the positive pressure between the driving wheel and the traveling surface less than or equal to the set threshold value, so that a friction force between the driving wheel and the traveling surface is increased, and an obstacle crossing capability of the autonomous mobile robot is improved.

It is finally to be noted that the above embodiments are adopted not to limit but only to describe the technical solutions of the present disclosure. Although the present disclosure has been described with reference to the above-mentioned embodiments in detail, those of ordinary skill in the art should know that modifications may still be made to the technical solutions recorded in each embodiment or equivalent replacements may be made to part of technical features therein. These modifications or replacements do not make the essences of the corresponding technical solutions depart from the spirit and scope of the technical solutions of each embodiment of the present disclosure.

What is claimed is:

1. An autonomous mobile robot, comprising:
   a machine body, having a base;
   a driving wheel, rotatably arranged on the base through a first rotating shaft;
   a pressure plate, rotatably arranged on the machine body through a second rotating shaft; and
   a force bearing portion, to keep in contact with the pressure plate;
   wherein, in response to a change between a first position and a second position of the driving wheel in relation to the machine body, a contact position between the pressure plate and the force bearing portion changes.

2. The autonomous mobile robot according to claim 1, wherein, the first rotating shaft and the second rotating shaft are parallel, and the second rotating shaft is closer to the driving wheel than the first rotating shaft.

3. The autonomous mobile robot according to claim 1, wherein, the first rotating shaft is located in front of the second rotating shaft along a traveling direction of the autonomous mobile robot.

4. The autonomous mobile robot according to claim 1, wherein, the first rotating shaft is located outside an area of a projection of the driving wheel, and the second rotating shaft is located within the area of the projection of the driving wheel.

5. The autonomous mobile robot according to claim 1, wherein, the first position is a relative position between the driving wheel and the machine body being high, and the second position is a relative position between the driving wheel and the machine body being low.

6. The autonomous mobile robot according to claim 1, wherein, the pressure plate has two sides disposed oppositely, and the changed contact position between the pressure plate and the force bearing portion is located on one of the two sides.

7. The autonomous mobile robot according to claim 6, wherein, the force bearing portion is a first roller, and the first roller rolls on a surface of the side.

8. The autonomous mobile robot according to claim 7, wherein, when the driving wheel moves from the first position to the second position, an included angle between a normal direction of a contact point between the pressure plate and the first roller and a center line of the first roller and the first rotating shaft increases.

9. The autonomous mobile robot according to claim 6, wherein, when the driving wheel moves from the first position to the second position, the contact point between the pressure plate and the first roller moves towards the second rotating shaft.

10. The autonomous mobile robot according to claim 6, wherein, a contact broadside between the pressure plate and the force bearing portion has a curved structure.

11. The autonomous mobile robot according to claim 1, further comprising:
a torsion spring sleeved on the second rotating shaft;
wherein, one end of the torsion spring is pressed against the pressure plate.

12. The autonomous mobile robot according to claim 11, wherein, when the driving wheel is located at the first position in relation to the base, an eccentricity pressure generated by the torsion spring reaches a max.

13. An autonomous mobile robot, comprising:
a machine body, having a base;
a driving wheel, rotatably arranged on the base through a first rotating shaft;
an elastic body, wherein one end of the elastic body is provided with a roller structure; and
a force bearing portion, having a curved structure, for pressing against the roller structure;
wherein, in response to a change between a first position and a second position of the driving wheel in relation to the machine body, a contact position between the elastic body and the force bearing portion changes.

14. The autonomous mobile robot according to claim 13, wherein, the elastic body is disposed along a vertical direction.

15. The autonomous mobile robot according to claim 13, wherein, the curved structure has an ascending slope surface and a descending slope surface.

* * * * *